(12) United States Patent
Van Den Engh

(10) Patent No.: US 11,287,364 B2
(45) Date of Patent: Mar. 29, 2022

(54) SYSTEM, APPARATUS AND METHOD FOR OFF-AXIS ILLUMINATION IN FLOW CYTOMETRY

(71) Applicant: Gerrit Jan Van Den Engh, Concrete, WA (US)

(72) Inventor: Gerrit Jan Van Den Engh, Concrete, WA (US)

( * ) Notice: Subject to any disclaimer, the term of this patent is extended or adjusted under 35 U.S.C. 154(b) by 0 days.

(21) Appl. No.: 17/144,586

(22) Filed: Jan. 8, 2021

(65) Prior Publication Data

US 2021/0123854 A1    Apr. 29, 2021

Related U.S. Application Data

(63) Continuation of application No. PCT/US2019/040942, filed on Jul. 9, 2019.

(60) Provisional application No. 62/695,937, filed on Jul. 10, 2018.

(51) Int. Cl.
*G01N 15/14* (2006.01)

(52) U.S. Cl.
CPC ..... *G01N 15/1459* (2013.01); *G01N 15/1434* (2013.01)

(58) Field of Classification Search
CPC ....... G01N 2015/1445; G01N 15/1434; G01N 15/1459
See application file for complete search history.

(56) References Cited

U.S. PATENT DOCUMENTS

| | | | | |
|---|---|---|---|---|
| 3,785,735 A | * | 1/1974 | Friedman | G01N 15/1434 356/39 |
| 3,826,364 A | * | 7/1974 | Bonner | G01N 15/1459 209/3.1 |
| 3,879,615 A | * | 4/1975 | Moser | G01N 15/0205 250/574 |
| 4,015,135 A | * | 3/1977 | Tipton, Jr. | G01N 15/0227 250/574 |
| 4,500,641 A | * | 2/1985 | van den Engh | C12M 41/36 356/318 |
| 4,885,463 A | * | 12/1989 | Wellman | G01R 31/2656 250/252.1 |
| 5,043,591 A | * | 8/1991 | Ludlow | G01N 15/1434 250/574 |
| 5,125,737 A | * | 6/1992 | Rodriguez | G01N 15/1459 356/39 |
| 5,671,046 A | * | 9/1997 | Knowlton | G01N 15/0205 356/336 |
| 5,815,410 A | * | 9/1998 | Heinke | G01J 5/22 250/338.1 |
| 6,198,110 B1 | * | 3/2001 | Kaye | G01N 15/1436 250/573 |
| 9,816,911 B2 | | 11/2017 | Chen et al. | |

(Continued)

FOREIGN PATENT DOCUMENTS

WO    2007100723 A2    9/2007

OTHER PUBLICATIONS

International Search Report and Written Opinion from PCT/US2019/040942, dated Oct. 9, 2019.

*Primary Examiner* — Rufus L Phillips

(74) *Attorney, Agent, or Firm* — Mark T. Vogelbacker; Eckert Seamans Cherin & Mellott, LLC

(57) ABSTRACT

A flow cytometer including a laser beam that impinges upon a sample stream at an angle at 15-70°, optionally 30°, from C an orthogonal plane where the light and fluid intercept.

11 Claims, 5 Drawing Sheets

(56) References Cited

U.S. PATENT DOCUMENTS

| | | | | |
|---|---|---|---|---|
| 2002/0020806 A1* | 2/2002 | Almi | ............ | H04N 3/10 |
| | | | | 250/227.2 |
| 2002/0084172 A1* | 7/2002 | Toms | ............ | G01N 15/1475 |
| | | | | 198/445 |
| 2005/0068536 A1* | 3/2005 | Schwabe | ............ | G01N 21/6428 |
| | | | | 356/436 |
| 2005/0112541 A1* | 5/2005 | Durack | ............ | G01N 15/1468 |
| | | | | 435/2 |
| 2005/0118723 A1* | 6/2005 | Padmanabhan | .. | A61B 5/150221 |
| | | | | 436/164 |
| 2007/0242269 A1* | 10/2007 | Trainer | ............ | G01N 15/1459 |
| | | | | 356/336 |
| 2008/0208511 A1* | 8/2008 | Trainer | ............ | G01N 15/1459 |
| | | | | 702/128 |
| 2009/0116011 A1* | 5/2009 | Kenyon | ............ | G01N 15/14 |
| | | | | 356/338 |
| 2011/0143389 A1 | 6/2011 | Sharpe et al. | | |
| 2011/0195492 A1 | 8/2011 | Sharpe et al. | | |
| 2013/0242301 A1* | 9/2013 | Berg | ............ | G01N 15/1475 |
| | | | | 356/336 |
| 2014/0030696 A1* | 1/2014 | Luscher | ............ | G01N 33/487 |
| | | | | 435/3 |
| 2014/0339446 A1* | 11/2014 | Yamamoto | ............ | G01N 15/1434 |
| | | | | 250/576 |
| 2014/0370536 A1 | 12/2014 | Sharpe et al. | | |
| 2016/0169787 A1* | 6/2016 | Crow | ............ | G01N 15/1434 |
| | | | | 356/338 |
| 2018/0284009 A1* | 10/2018 | Kaduchak | ............ | G01J 3/4406 |

\* cited by examiner

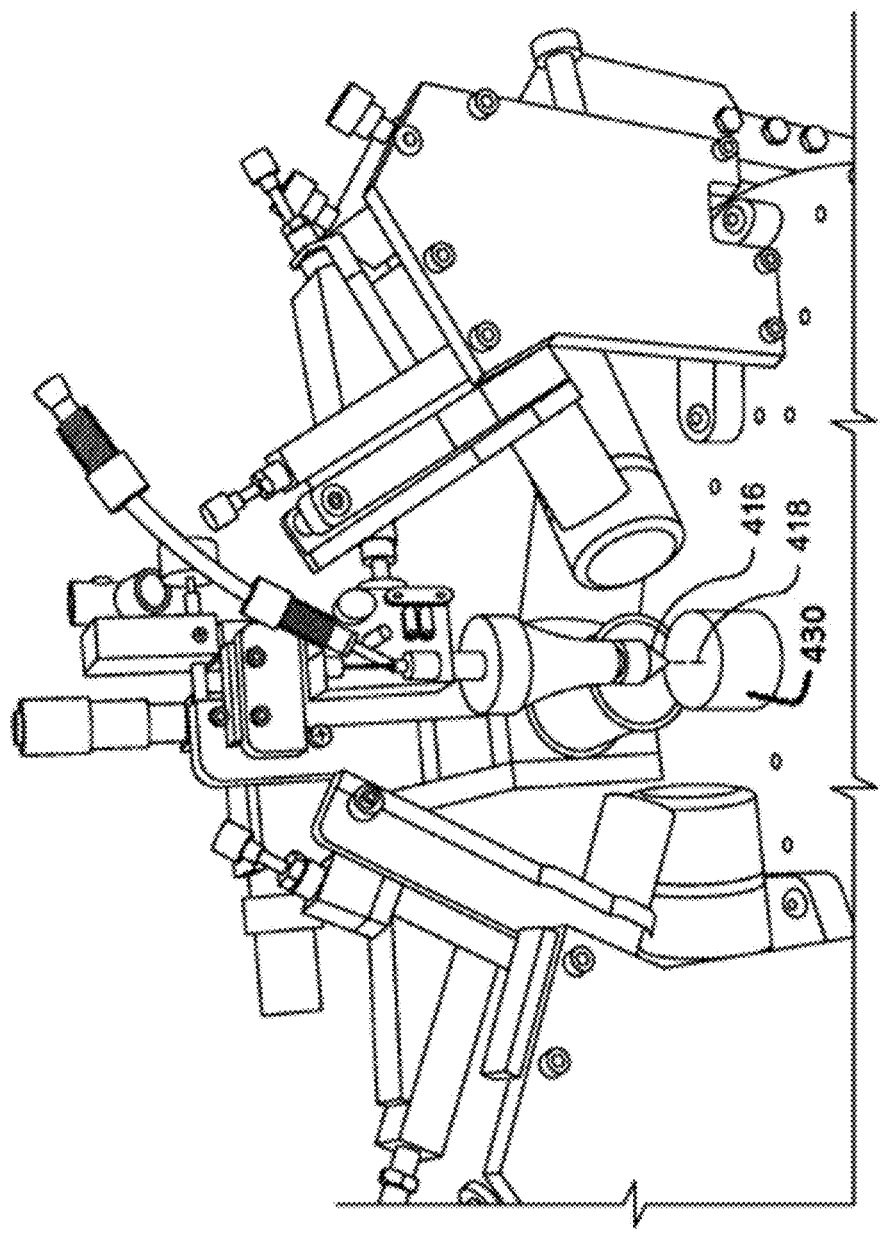

SYSTEM, APPARATUS AND METHOD FOR OFF-AXIS ILLUMINATION IN FLOW CYTOMETRY

CROSS-REFERENCE TO RELATED APPLICATION

The present application is a continuation of International Application No. PCT/US2019/040942, filed Jul. 9, 2019 and titled "SYSTEM, APPARATUS AND METHOD FOR OFF-AXIS ILLUMINATION IN FLOW CYTOMETRY," which claims priority to U.S. Provisional Application No. 62/695,937, filed Jul. 10, 2018 and titled "SYSTEM, APPARATUS AND METHOD FOR OFF AXIS ILLUMINATION IN FLOW CYTOMETRY," the entire disclosures of which are hereby incorporated by reference in their entirety.

FIELD

The presently disclosed technology relates to flow cytometry. More particularly, in one embodiment, the presently disclosed technology relates to off-axis illumination in flow cytometry and the capture of scatter light and fluorescence.

BACKGROUND AND DESCRIPTION OF RELATED ART

Flow cytometry measures and analyzes multiple physical characteristics of single particles, usually cells, as they flow in a fluid stream through a beam of light. The properties measured include a particle's relative size, relative granularity or internal complexity, and relative fluorescence intensity. The stream of particles is so stretched out that the particles cross the beam of light one by one in rapid succession. In one example, 100-10,000 particles per second traveling at velocity of 1-10 m/s in a 10 μm core contained in a 100 μm stream. The light induces small optical signals whenever a particle crosses the beam. One or more detectors are placed so that it observes the point where laser path and cell trajectory intersect. The detector may register scatter and fluorescence signals of different colors and/or polarization. The signals provide an indication of the number and type of cells that are present in the sample.

Flow cytometry is often used to count and analyze blood cells. The technology plays a key role in HIV diagnosis and the classification of blood cancers. It is also an important research tool. In recent years, flow cytometry has been used with much success in the analysis of plankton in the ocean and fresh water samples.

In certain prior art arrangements, such as that shown in FIG. 1, the illumination light 14 is orthogonal to the trajectory of the particles 20. In these instruments the detector(s) 22 is/are also orthogonal to the particle path. One such arrangement is disclosed in U.S. Pat. No. 9,453,789, which is incorporated herein by reference. When illuminating a flow cytometer's stream along an orthogonal axis, the detectors 22 need to be shielded with an obscuration bar 24 to eliminate the light from the beam and its scatter/reflections. This narrows or limits the useful aperture 26 of the detector 22. Scatter cannot be completely eliminated, resulting in background signal noise.

In certain other prior art arrangements, such as that shown in FIG. 2, the detectors 122a, 122b detect light emitted along the direction of travel. To conserve a full aperture 126a, 126b of the detectors 122a, 122b, the detectors 122a, 122b may be placed along the axis of the liquid jet (such as above and below the laser/jet intercept), according to patents from Muriella et al. (such as U.S. Pat. No. 5,475,487, which is incorporated by reference herein) and van den Engh et al. (such as U.S. Publication No. 2014/0320861, which is incorporated by reference herein). In that case, the light collected reaches the detectors by means of internal reflection inside the liquid jet. This method is rarely used.

The above-described arrangements of FIGS. 1 and 2 have been the standard for the majority of the technology's approximately fifty (50)-year existence. The orthogonal arrangement is convenient for the optical design. The mechanisms that move and align the optical components (e.g., lenses that focus the beam(s) of light, the mechanism that focuses the detector onto the measurement field, and other adjustment mechanisms) are easiest to design, manufacture and adjust when all components move along orthogonal paths.

BRIEF SUMMARY

Despite the numerous benefits of conventional flow cytometry, there is at least one large disadvantage to an orthogonal optical geometry. In the prior art, the laser light is scattered by the sample stream. Since the two are orthogonal, the scatter is located in a plane around the fluid stream. In the prior art, the same plane also has the detectors and other light paths. If no measurements are taken, the scatter light will enter the detector. Since the scatter is significantly brighter than the signals produced by the particles, the detectors will be blinded. Therefore, all instruments with an orthogonal optical geometry need scatter bars that mask the scatter light and optical filters that block unwanted colors. Designing and adjusting the scatter bars or masks is a delicate art and greatly affect the quality of the scatter signals. This is especially problematic when multiple laser beams are used. Poor adjustment of the scatter masks resulted in highly-varied data from numerous labs. In addition, the light scattered from the sample stream is directed all around and may escape from the measurement area exposing technicians to scattered laser light.

For these reasons, improvements are necessary for conventional flow cytometry to overcome the above-identified and other drawbacks of the prior art. The presently disclosed technology addresses and corrects the above-identified and other issues of the prior art.

In one embodiment, the presently disclosed technology is directed to a flow cytometer including a light source configured to emit at least one beam of light along a first axis. The flow cytometer can also include a passageway configured to permit liquid carrying particles to pass therethrough. The passageway defines or at least extends along a second axis. The second axis can extend at an angle of greater than 0° and less than 90° with respect to the first axis. The flow cytometer can also include at least one detector configured to observe at least a point where the beam of light and liquid intersect.

In another embodiment, the presently disclosed technology is directed to a flow cytometer including a light source configured to emit at least one beam of light along a first axis. The flow cytometer can also include a passageway configured to permit liquid carrying particles to pass therethrough. The passageway defines or at least extends along a second axis. The flow cytometer can also include at least one detector configured to observe at least a point where the beam of light and liquid intersect. Optionally, no obscuration bar or scatter bar is used such that an entire aperture of the at least one detector is exposed to at least one beam of light.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings:

FIG. 5 is an image of at least a portion of one system or device according to an embodiment of the presently disclosed technology.

DETAILED DESCRIPTION

Figure 1:
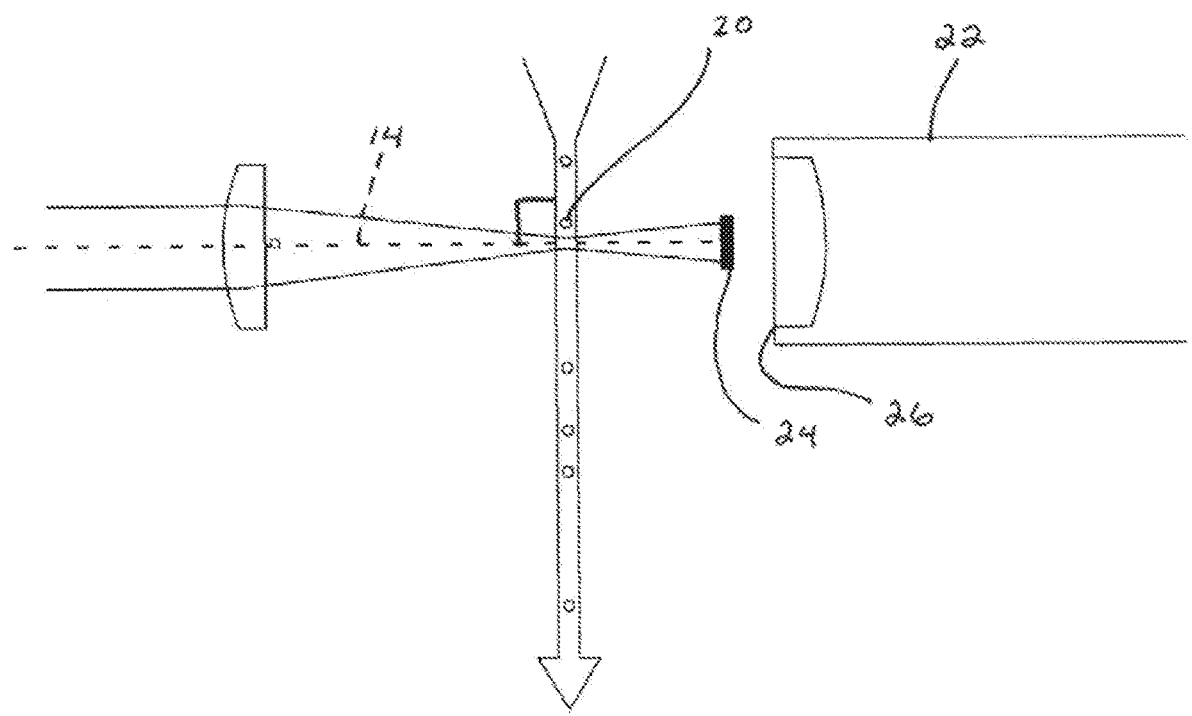
FIG. 1 is a schematic view of one arrangement in the prior art.
Figure 2:
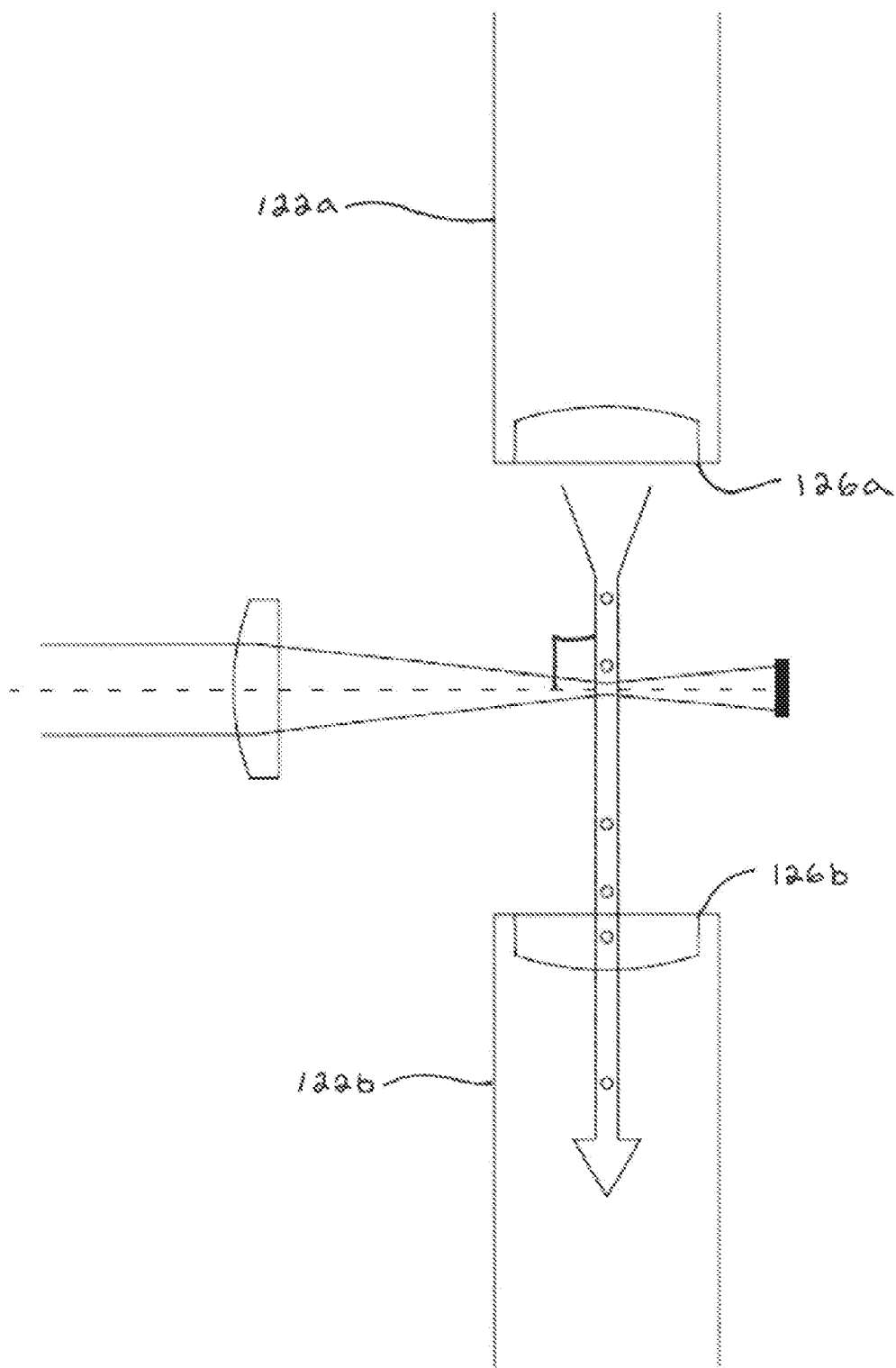
FIG. 2 is a schematic view of another arrangement in the prior art.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

In one embodiment, the presently disclosed technology is directed to an instrument in which a laser beam impinges upon a sample stream at an angle. For example, the angle can optionally be a first angle $\alpha$, such as approximately or exactly 30°, measured from an orthogonal plane P, or a second angle $\theta$, such as approximately or exactly 60°, measured from a flow axis $A_2$. Optionally, the second angle $\theta$ can be in the range of 30–75°, or 37° or 34°, from the flow axis. Optionally, the first angle $\alpha$ can be in a complementary range or at a complementary value.

In certain instances, a second angle $\theta$ of 60° is optimal, but not required, because it offers most of the advantages described herein and is relatively easy to construct. A second angle $\theta$ of 34° is optimal, but not required, from a physics point of view because there is perfect optical coupling of the laser and jet and all reflections can be eliminated by adjusting the polarization direction of the incident light to be in the plane of the jet surface. A second angle $\theta$ of 34° is optimal, but not required, if the sample stream is contained in a glass channel. A second angle $\theta$ of 37° is optimal, but not required, if the sample stream is liquid in an air jet.

Optionally, the system can capture the direct laser light and the light scattered by the stream with a cylindrical beam dump. In one embodiment, multiple detectors can be placed in a ring, for example, around the illumination point due to the increased spaced created by the placing the laser optics above the orthogonal intercept plane. Such a system can be easily adjusted and optimized, and eliminates the need for scatter bars, thereby greatly improving the effective numerical aperture of the detectors. In addition, due to the low background scatter light generated or resulting, the presently disclosed technology offers a superb signal-to-noise measurement on small, dim particles that are very difficult to measure on the on prior art flow cytometers. Optionally, two opposing detectors can face one another along a common axis (e.g., see FIG. 4).

The off-axis illumination of the presently disclosed technology has many advantages. For example, first, the scatter from the stream is directed downward in a conical shape and can be collected in a cylindrical light trap. The risk of light escaping and blinding the operator is minimized Second, since the optical components that bring the light to the measurement point are outside of the orthogonal plane, there is more room for detectors. In traditional instruments the plane is crowded with components and only two detector channels are possible. When the illumination optics are above the plane of detection 4 or even 5 detectors (including backscatter detectors which are impossible in the orthogonal geometry) become possible. Third, the angle of incidence of the laser beam is closer to the critical angle at which there is no scatter from the liquid surface. The non-orthogonal arrangement has less surface scatter than the orthogonal arrangement. Fourth, since the scatter light is contained in a downward cone and can be trapped in a cylindrical beam dump, there is no scatter light in the plane of the detectors. In many cases there is no need for scatter masks or laser blocking filters. Thus, the problem of selecting the proper chromatic bands for signal detection is made much easier. In addition, the use of multiple detectors enables the possibility of spreading different detection colors over multiple detector assemblies. In certain prior art systems one has to design elaborate filter sets to use a single detector channel for multiple colors, but the non-orthogonal design of one embodiment of the presently disclosed technology we can uses multiple detectors, each specializing in a restricted color range.

Figure 3:
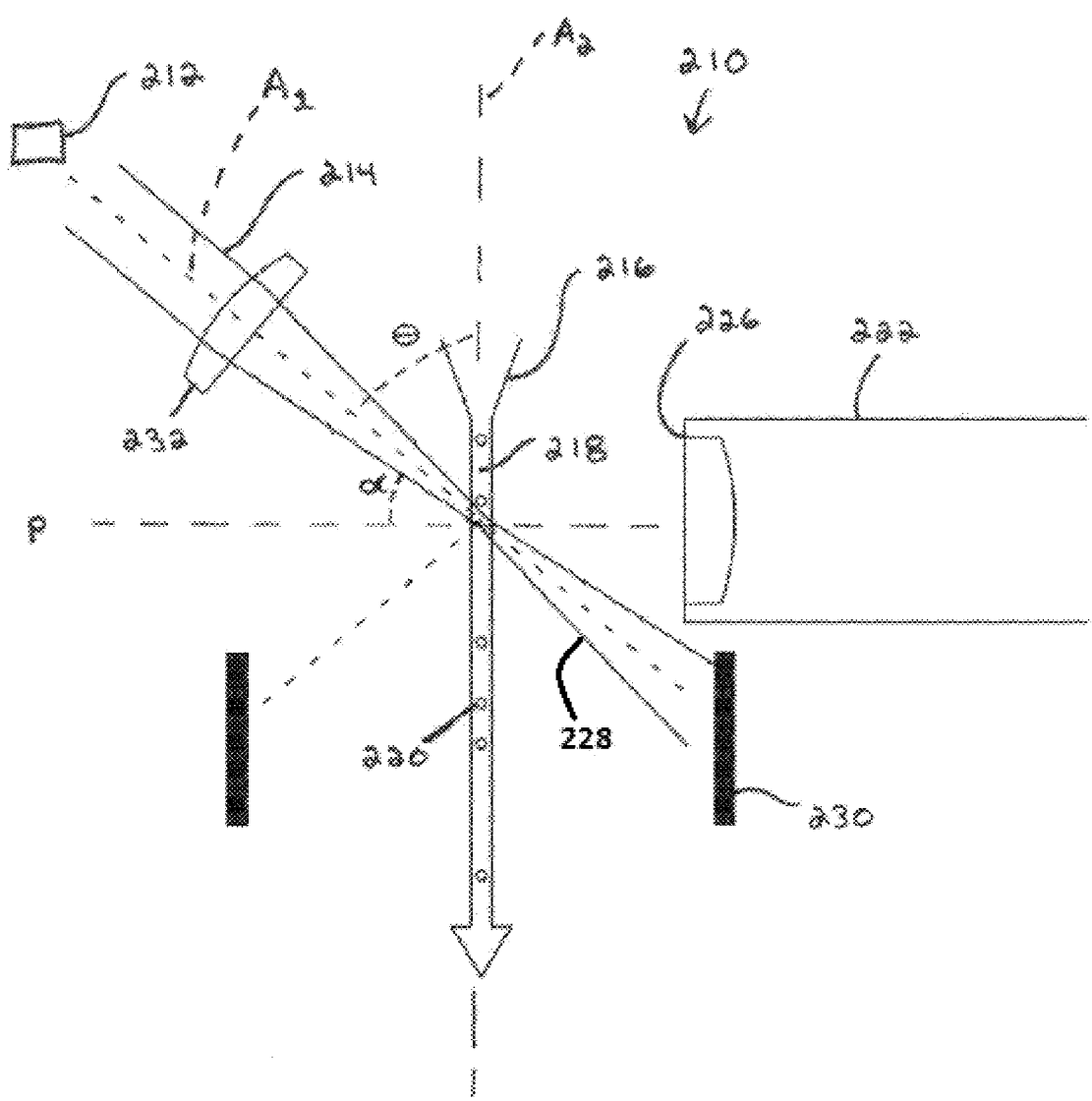
FIG. 3 is a schematic view of an arrangement according to one embodiment of the presently disclosed technology.

Referring now in detail to the various figures, wherein like reference numerals refer to like parts throughout, FIG. 3 illustrates one embodiment of at least a portion of a flow cytometer, generally designated 210, of the presently disclosed technology. The flow cytometer 210 can include a light source 212, such as but not limited to a laser, configured to emit at least one beam of light 214 (e.g., a laser beam) along a first axis $A_1$ and a passageway 216 configured to permit fluid 218, such as liquid or gas, carrying one or more particles 220 to pass therethrough. The passageway 216 defines or extends along a flow axis or a second axis $A_2$. The fluid 218 may be a jet or may be contained inside a glass capillary, for example, that forms the passageway 216. The flow cytometer 210 can include at least one detector 222 with a full or fully exposed aperture 226, a cone 228 (optionally of approximately or exactly 60 degrees) and a beam dump 230. Optionally, the beam dump 230 can be cylindrical.

A second angle θ, at which the first axis $A_1$ extends with respect to the second axis $A_2$, is greater than zero degrees and less than 90°. Optionally, the second angle θ is between 20-75°, optionally between 34-70°, and optionally 30°. At least one focusing lens 232 can be positioned in the first axis $A_1$ between (e.g., spaced-apart from) the light source 212 and the passageway 216. Of course, the second angle θ can be calculated as 90° minus the first angle α.

When the excitation laser beam is lifted or positioned at the first angle α above or away from the orthogonal plane P of the laser/jet intercept or at the second angle θ, the exit beam and scatter beams are contained within the cone 228 and can be intercepted by the beam dump 230. The detector 222 can now utilize its full aperture 226. Scatter light and background noise are completely eliminated. No obscuration or scatter bar is necessary.

Figure 4:
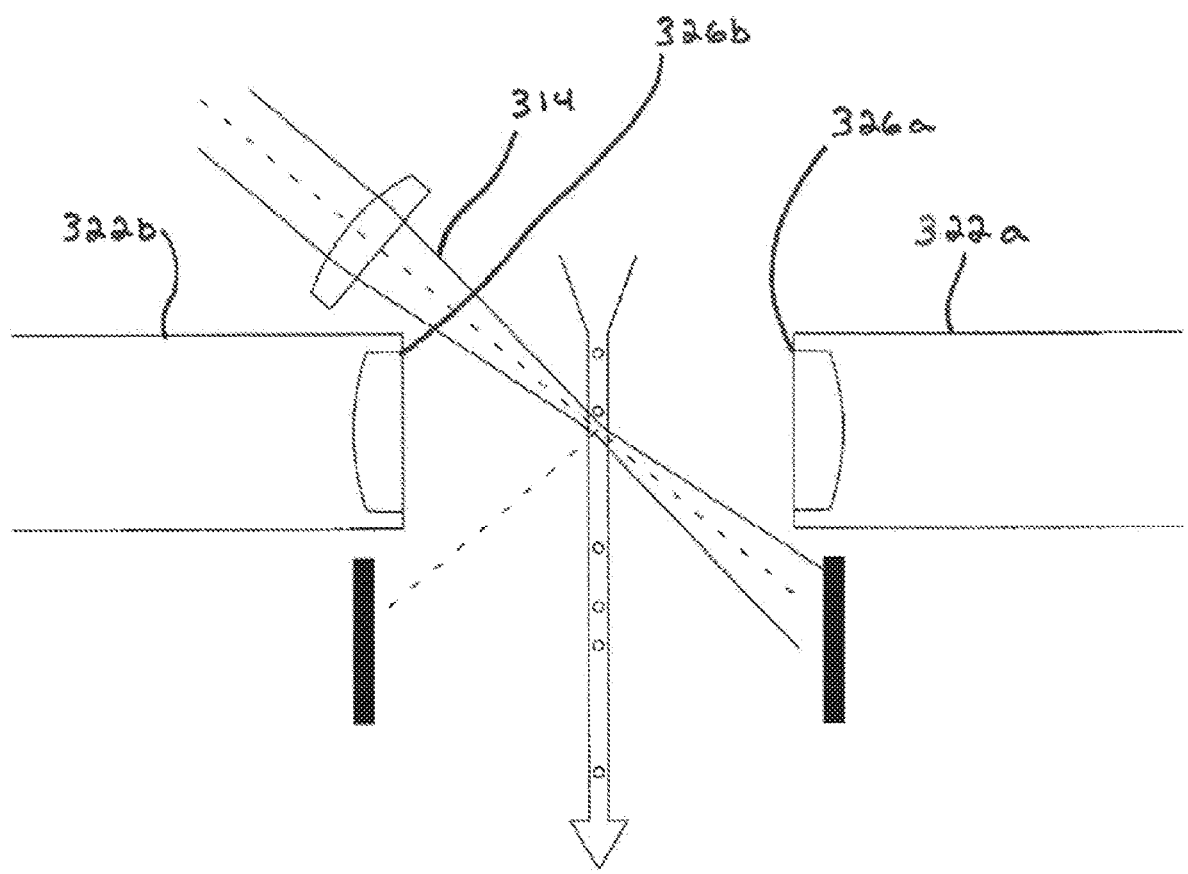
FIG. 4 is a schematic view of an arrangement according to another embodiment of the presently disclosed technology.

FIG. 4 shows another embodiment of the presently disclosed technology. Similar or identical structure as between the embodiment of FIG. 3 and the embodiment of FIG. 4 is distinguished in FIG. 4 by a reference number with a magnitude one hundred (100) greater than that of FIG. 3. Description of certain similarities between the embodiment of FIG. 3 and the embodiment of FIG. 4 may be omitted herein for convenience and brevity only.

As shown in FIG. 4, when the excitation laser beam is sufficiently lifted above the orthogonal plane through the laser/jet intercept, the plane is free of optical components and additional detectors 322a, 322b can be placed around the intercept point. The use of multiple detectors allows signal collection at different angles and simplifies the design of filter scheme for specific chromatic bands. This arrangement also allows back scatter detection. In the current embodiment, up to six detectors can be placed around the intercept point at selectable angles. Each of these detectors can have a full aperture 326a, 326b exposed or available to the light beam 314. Prior art instruments have, at most, only two orthogonal detectors.

FIG. 5 shows an image of another embodiment of the presently disclosed technology. Similar or identical structure as between the embodiment of FIG. 4 and the embodiment of FIG. 5 is distinguished in FIG. 5 by a reference number with a magnitude one hundred (100) greater than that of FIG. 4. Description of certain similarities between the embodiment of FIG. 4 and the embodiment of FIG. 5 is omitted herein for convenience and brevity only and is not limiting.

FIG. 5 shows a cylindrical beam dump 430 and fluid 418 emanating from a nozzle or passageway 416.

The following exemplary embodiments further describe optional aspects of the presently disclosed technology and are part of this Detailed Description. These exemplary embodiments are set forth in a format substantially akin to claims (each with numerical designations followed by the letter A), although they are not technically claims of the present application. The following exemplary embodiments refer to each other in dependent relationships as "embodiments" instead of "claims."

1A. A flow cytometer comprising:
a light path extending along a first axis; and
a fluid flow path extending along a second axis,
wherein the first axis extends at an angle of greater than 0° and less than 90° with respect to the second axis.

2A. The flow cytometer of embodiment 1A, further comprising:
at least one detector configured to observe at least a point where the beam of light and liquid intersect.

3A. The flow cytometer of embodiment 1A or 2A, wherein the angle is between 20-75°.

1B. A method of eliminating the need to partially shield a detector of a flow cytometry system, the method comprising:
arranging a light beam to extend at an angle of greater than 0° and less than 90° with respect to a fluid flow path carrying particles therein.

2B. The method of embodiment 1B, wherein the angle is between 20-75°.

3B. The method of embodiment 2B, wherein the angle is between 34-70°.

4B. The method of embodiment 3B, wherein the angle is approximately 60°.

5B. The method of embodiment 3B, wherein the angle is approximately 37°.

1C. A system configured to eliminate the need to partially shield a detector of a flow cytometer, the system comprising:
a light path extending along a first axis; and
a fluid flow path extending along a second axis,
wherein the first axis extends at an angle of greater than 0° and less than 90° with respect to the second axis.

2C. The system of embodiment 1C, wherein the angle is between 20-75°.

3C. The system of embodiment 2C, wherein the angle is between 34-70°.

4C. The system of embodiment 3C, wherein the angle is approximately 60°.

5C. The system of embodiment 3C, wherein the angle is approximately 37°.

6C. The system of any one of embodiments 1C-5C, further comprising:
at least one detector configured to observe at least a point where the light path and the fluid flow path intersect.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

What is claimed is:

1. A flow cytometer configured to reduce liquid jet scatter noise, the flow cytometer having an orthogonal plane that extends orthogonally to a flow plane through which a flow axis of the flow cytometer extends, the flow axis being an axis along which particles are carried by liquid, the flow cytometer comprising:
a light source configured to emit at least one beam of light along a first axis, the first axis extending in a plane distinct from the orthogonal plane and extending at a first angle above the orthogonal plane such that the light source is located above the orthogonal plane;
a passageway permitting a liquid jet carrying particles to pass therethrough, the particles traveling in the passageway in a direction from above the orthogonal plane to below the orthogonal plane, the passageway extending along the flow axis, the flow axis extending in the flow plane that is distinct from the plane through which the first axis extends, the flow axis extending at a second angle of greater than 0° and less than 90° with respect to the first axis, the flow axis being distinct from the orthogonal plane;

a first detector located in the orthogonal plane and configured to observe at least a point where the beam of light and liquid intersect;

a second detector located in the orthogonal plane and configured to observe at least the point where the beam of light and liquid intersect, the second detector being spaced-apart from the first detector, the second detector being configured to detect back scatter; and at least one beam dump and at least one cone, the at least one beam dump being configured to receive at least some of at least one exit beam from the at least one beam of light, the at least one beam dump being cylindrical, the passageway extending between the second detector and the beam dump, each of the at least one beam dump and the at least one cone being positioned in a plane distinct from the orthogonal plane, each of the at least one beam dump and the at least one cone being located below the orthogonal plane, wherein the light is scattered downward in the at least one cone, which is intercepted by the cylindrical beam dump that wraps around at least a portion of the passageway.

2. The flow cytometer according to claim 1, wherein the second angle is between 20-75°.

3. The flow cytometer according to claim 2, wherein the second angle is between 34°-70°.

4. The flow cytometer according to claim 3, wherein the second angle is approximately 60°.

5. The flow cytometer according to claim 3, wherein the second angle is approximately 37°.

6. The flow cytometer according to claim 1, wherein the light source is at least one laser.

7. The flow cytometer according to claim 1, wherein the flow cytometer does not have an obscuration bar or a scatter bar.

8. The flow cytometer according to claim 1, wherein an entire aperture of the first detector is exposed to the at least one beam of light.

9. The flow cytometer according to claim 1, wherein the first and second detectors are two of six total detectors of the flow cytometer.

10. The flow cytometer according to claim 1, further comprising at least one focusing lens positioned in the first axis between the light source and the passageway.

11. The flow cytometer of claim 1, wherein the second angle is greater than 22° and less than 70°.

* * * * *